# United States Patent Office 3,561,978
Patented Feb. 9, 1971

3,561,978
METHOD OF PREPARING A FRANKFURTER PRODUCT AND COMPOSITION FOR USE THEREIN
Alan S. Geisler, Ramsey, and Gregory C. Papalexis, Alpine, N.J., assignors to Technical Oil Products, Inc., Moonachie, N.J., a corporation of New Jersey
No Drawing. Continuation-in-part of application Ser. No. 500,162, Oct. 21, 1965. This application Apr. 15, 1969, Ser. No. 816,399
Int. Cl. A22c 11/00
U.S. Cl. 99—109                              6 Claims

ABSTRACT OF THE DISCLOSURE

The color, taste, and shelf life of frankfurters are improved by incorporating, within the frankfurter meat prior to introducing the same into a casing, a minor amount of sorbitol. In addition, a frankfurter having enhanced peeling characteristics is provided by including within the frankfurter meat a composition comprsing minor amounts of sorbitol and dimethylpolysiloxane.

---

The present application is a continuation in part of copending application, Ser. No. 500,162, filed Oct. 21, 1965, now abandoned.

The present invention is directed to an improvement in frankfurters, a method of improving the shelf life, color and taste thereof, and a composition to be employed in such frankfurter to produce such improved results; more particularly, the present invention is directed to such product, method and composition wherein the improvement associated with the color, peeling characteristics, shelf life, etc., is associated with the employment of a minor amount of sorbitol.

It has been the general industrial practice for many years to enhance the color of frankfurters through the use of either "natural" colors such as spice extracts added solely for their color value, i.e., oleoresin paprika, or through the use of coal tar dyes. This last means of improving the color of frankfurthers is most widely done in pork frankfurters because of the poor pale color normally obtained when pork is used in whole or in part as the meat of the frankfurter. The use of "natural" colors, however, is now prohibited by the USDA as a deceptive practice. Accordingly, such natural colors cannot now be employed to improve the color of frankfurters.

Additionally, it is pointed out that while the use of artificial coloring is permitted by the USDA, such use of artificial coloring must be prominently displayed on the frankfurter label. This, of course, is undesirable from the standpoint that it reduces consumer appeal, a disadvantage to packagers and producers of frankfurters. It is additionally pointed out that it is somewhat difficult to obtain a good meat-like color utilizing coal tar dyes since the number of such dyes permitted by the Food and Drug Administration is very limited. In this regard, many states and localities do not permit the use of artificial color at all, even when the same is clearly displayed on labels, thereby making it difficult for the packer to produce an appetizing product even when quality, wholesome ingredients are utilized.

A further problem encountered by the frankfurter industry is with regard to the shelf life of frankfurters, that is, the ability of the frankfurter to withstand spoilage when stored over a long period of time. Thus, even when kept under conditions of good refrigeration, the limited shelf life of frankfurters poses a problem. In this connection, spoilage is generally manifested in two ways. The first of these results in slime formation on the outer surface, and the second results in the development of a green color on the inside, sometimes known as "green weenies." With respect to such spoilage of frankfurters due to their generally limited shelf life, it is noted that regardless of whether the frankfurters are skinless or the type having a casing, the frankfurters are ready to eat, even without cooking, since they have been previously subjected to smoking involving the application of heat over an extended period of time. Accordingly, once the frankfurter goes bad, cooking by the housewife cannot make the meat wholesome again. The limited shelf life of frankfurters is therefore a serious problem of the frankfurter industry.

In addition to the above disadvantages and problems associated with frankfurter manufacture, the production of skinless frankfurters while lending itself readily to recent high speed manufacturing concepts, presents a disadvantage with respect to difficulties involved in the peeling operation. Thus, in the production of skinless frankfurters employing high speed apparatus, the percentage of damaged pieces is often very high and the time lost and extra labor required to hand-peel these pieces which the apparatus could not do, is costly and greatly reduces productivity. Such disadvantages associated with the production of skinless frankfurters offsets many of the advantages gained through the use of synthetic films in lieu of the natural casings, i.e., sheep intestines, originally and still employed.

Accordingly, it is a principal object of the present invention to provide a frankfurter, a method of improving the same, and a composition therefore, which frankfurter, method and composition have significantly reduced the inherent deficiencies and disadvantages of the prior art.

It is yet a further object of the present invention to provide a frankfurter having improved color and improved shelf life, such improved properties being associated with incorporation within the frankfurter meat of a minor amount of sorbitol.

A still further object of the present invention relates to a method of improving the peeling characteristics associated with the incorporation of a minor amount of sorbitol, preferably in combination with dimethylpolysiloxane.

A still further object of the present invention comprises a combination to be employed as an additive for a frankfurter to improve the peeling characteristics thereof, such composition comprising minor amounts of sorbitol and dimethylpolysiloxane.

Still further objects of the novel product, method and composition of the present invention will become more apparent from the following more detailed description thereof:

Frankfurters are a meat product generally containing in addition, spices, curing salts, optional cereals and ice as major ingredients. These ingredients are generally combined in a chopper and chopped finely to form an emulsion. Such emulsion is then stuffed into a casing, tied off into links, and then smoked so as to cook the meat and impart the characteristic appearance and texture associated with this type of product. As indicated previously, however, such production of frankfurters is fraught with disadvantages, particularly in the area of maintaining good color appearance and increased shelf life of the meat product in addition to the creation of satisfactory peeling characteristics.

With respect to this latter feature, it is pointed out that two methods are commonly used in the production of frankfurters. The original technique still used involves the use of natural casings, usually sheep intestines as the casing into which the emulsion is filled. The other method involves the use of synthetic films as casings during the smoking process which are later peeled off to produce the so called skinless frankfurter. It is with respect to such so called skinless frankfurters that problems have arisen with respect to providing such frankfurter product with satisfactory peeling characteristics.

All of these disadvantages and deficiencies of previous methods for producing frankfurters and the products so produced have been significantly reduced in accordance with the present invention whereby such color, shelf life, peeling characteristics, etc., are improved by incorporating within the frankfurter meat a minor amount of sorbitol.

While the use of corn syrup or corn sugar has been previously employed to improve the properties of frankfurters, particularly the peeling characteristics of frankfurters, the use of sorbitol in accordance with the present invention has been found to be unexpectedly superior to the use of this previously employed material. In this regard also it is pointed out that corn syrup or corn sugar has a further drawback in that such material tends to caramelize when subjected to heat for prolonged periods of time. While the heat of boiling is not generally great enough to produce this caramelization effect, extended contact of the frankfurter with a grill will cause caramelization to occur and often result in the production of an off color and bitter flavor. Sorbitol, however, does not possess this caramelization tendency although it has the effect of improving the color, improving the shelf life and improving the peeling characteristics of the frankfurter. Thus sorbitol manufactured by reduction of corn sugar, or glucose, by hydrogenation, having the same beneficial characteristics as the sugar from which it is derived has the further advantages of unexpected improvements in shelf life, color and peeling characteristics of the frankfurters in which such material in incorporated in accordance with the present invention.

In accordance with the present invention it has been found that the sorbitol is generally incorporated in the frankfurter in an amount of from about 0.5% by weight to about 5.0% by weight based upon the weight of the emulsion from which the frankfurter product is produced.

Preferably the amount of sorbitol included within the frankfurter is in the range of 1.0% to 5.0% by weight, most preferably 2.0% to 3.0% by weight based upon the weight of the emulsion. Of course, it should be clear that the above ranges are only exemplary and slightly lesser or greater amounts of the active sorbitol can be added to the frankfurter where desired for particular purposes.

It should also be noted that the active sorbitol can be added to the frankfurter during any stage of its manufacture that the sorbitol can be thoroughly dispersed in the emulsion; however, it is preferred in accordance with the present invention, that the sorbitol be added to the emulsion, consisting essentially of meat and optional fillers, prior to stuffing the same into casings in order to form the frankfurter product subsequently smoked so as to cook the meat, the addition being most preferably made during chopping. In this regard, the sorbitol can be added to the frankfurter emulsion either in its powder or crystal form or, more preferably in the form of an aqueous solution or dispersion of the same. Generally, the sorbitol is added to the frankfurter emulsion in the form of a 20% to 90% aqueous solution, preferably about a 70% solution of the active component.

It appears quite unexpected that a sorbitol solution, a colorless liquid would exhibit a color enhancement to a frankfurter product such as found in accordance with the present invention. In this regard, it has been discovered that by the inclusion of sorbitol in the frankfurter, as noted above, a significant improvement in the color of the finished frankfurter after smoking occurs. Such color improvement is not noted prior to the smoking process but after smoking the color developed is particularly meat-like and quite desirable from an esthetic standpoint. Moreover, in addition to this improvement of the frankfurter color associated with the employment of a minor amount of sorbitol, as set forth above, it has been found in accordance with the present invention that the frankfurters containing the active sorbitol had substantially less of a tendency to fade on standing than those containing no additives or those containing the so called "natural" colors. The color enhancement associated with the employment of the clear sorbitol solution or the crystalline sorbitol appears to be completely unexpected in that closely related corn syrup is seen to provide no color enhancement at all. The use of sorbitol in accordance with the present invention, therefore, has certain advantages not associated with the employment of closely related prior art materials.

Moreover, in addition to the color improving or enhancing properties of sorbitol when added to the frankfurter, it has been found in accordance with the present invention, that the employment of such a minor amount of sorbitol in the frankfurter product provides for a product having a longer shelf life, that is, a product exhibiting less spoilage over extended periods of time that similar products containing corn syrup or additives of this type. In this connection it has been found in accordance with the present invention that, unlike corn syrup, the presence of sorbitol within the frankfurter product does not provide a good medium for bacterial growth. Accordingly, the use of sorbitol does not promote spoilage and, in fact, provides for a product having a longer shelf life than would be expected with the use of other conventional additives for this purpose.

Thus, in this regard, as will be shown hereinafter, it has been demonstrated that the employment of sorbitol provides for actual bacteriostatic properties, this property being demonstrated by a comparison of franks containing no sugar or syrups at all.

It has furthermore been discovered in accordance with the present invention that the improvement in the peeling characteristics of skinless frankfurters associated with the incorporation of sorbitol in accordance with the present invention, can be even further enhanced by the inclusion of a further minor amount of dimethylpolysiloxane. This additive, preferably added as an aqueous emulsion to the meat emulsion employed in the production of the frankfurter generally is employed in an amount of from about 0.01% to about 0.05% by weight based upon the weight of the sorbitol. Thus it has been found in accordance with this embodiment of the present invention, that while the use of sorbitol alone in the amounts set forth above does provide enhanced peeling characteristics to the frankfurter, the combined employment of sorbitol and dimethylpolysiloxane provides for even enhanced properties, better than those associated with the employment of any previously employed peeling agent. Accordingly, a suitable composition in accordance with the present invention, to be added to a frankfurter to improve the various properties or qualities specified above, can consist essentially of an aqueous solution or emulsion of sorbitol and from about 0.01 to about 0.05% by weight of dimethylpolysiloxane based upon the weight of the sorbitol. In such a composition particularly adapted to be added to a frankfurter to improve color, shelf life and peeling characteristics, the sorbitol is generally present in an amount of about 20% to about 90% by weight as previously specified.

The following examples are presented for a clear understanding of the product, method and composition of the present invention. In such examples, unless otherwise specified, all percentages are by weight. In the following examples, in making an evaluation of color, a standard scale of 0-10 is used, the higher the numerical value the more desirable the color.

EXAMPLE I

A composition for the preparation of a frankfurter was prepared from the following substituents:

Bull meat—210 lbs.
Beef trimmings, plate ends—140 lbs.
Beef trimmings, fatty—50 lbs.
Soy flour—12 lbs.
Spices—5 lbs., 4 oz.
Salt—10 lbs., 8 oz.

To such a composition sorbitol was added in the form of a 70% solution such that this additive was present in amounts of 0.5%, 1.0%, 2.0%, 3.0% and 5.0% by weight based upon the total meat composition of the above composition.

The meat composition including the sorbitol additive was then stuffed into non-edible cellulose casings, tied off into links and smoked in a conventional manner to produce the finished frankfurter.

When the non-edible cellulose casings were stripped away, it was found that the frankfurters containing the sorbitol additive allowed for a greater ease of peeling indicating the improved peeling characteristics associated with the employment of this additive.

In addition, a visual examination of the frankfurters containing the sorbitol additive indicated that the same had very esthetic meat coloration.

EXAMPLE II

Similar frankfurters were prepared as in Example I except that dimethylpolysiloxane was added to various formulations in amounts of 0.01, 0.03, and 0.05% by weight based upon the weight of the added sorbitol. The dimethylpolysiloxane added to the frankfurter composition prior to stuffing the same into the non-edible cellulose casings was added in the form of a water emulsion. In this way the dimethylpolysiloxane can be uniformly distributed through the frankfurter.

When the frankfurters containing the dimethylpolysiloxane were peeled as in Example I, it was discovered that the products of Example II had even further improved peeling characteristics than the frankfurters of Example I containing only sorbitol. Both products, however, possessed improved peeling characteristics and improved flavor as compared to products in which the additives were omitted. In this regard it was found that both the products of examples I and II resisted caramelization when held on a hot plate for a substantial period of time and that the products having the sorbitol or sorbitol and dimethylpolysiloxane had an improved flavor when compared to products of the same meat composition without the additives of the present invention.

EXAMPLE III

The following experiment was conducted in order to illustrate the unexpected superiority of the employment of sorbitol when compared to the use of corn syrup, particularly with respect to color and peeling characteristics.

Skinless frankfurters were made using a blend of pork and beef. Frankfurters were evaluated for color both uncooked as they would be in the store, and after cooking in hot water for several minutes.

| A. (uncooked) | 0 day | 7 days | 14 days |
|---|---|---|---|
| (1). 1.65% sorbitol solids [1] | 8 | 9 | 9 |
| (2). 1.90% corn syrup solids | 6 | 5 | 4 |

[1] Plus 10 p.p.m. polysiloxane.

The frankfurters containing sorbitol exhibited a better color after standing 24 hours than when fresh. After a week, no change in color was noted. The frankfurters containing corn syrup exhibited a loss in color on standing, which is normal.

| B. (cooked) | 0 day | 7 days | 14 days |
|---|---|---|---|
| (1). Sorbitol | 9 | 10 | 10 |
| (2). Corn syrup | 7 | 6 | 6 |

Tests for peeling were also run and the frankfurters containing sorbitol were found to be superior. The number of "skips" were approximately 0.6% as compared to 1.0% for those containing corn syrup.

EXAMPLE IV

A similar experiment as shown in Example III was conducted on all beef skinless franks. Here again, frankfurters were evaluated for color, both uncooked as they would be in the store and after cooking in hot water for several minutes. The results of such evaluation can be seen in the following table:

| Color: A. (uncooked) | 0 day | 7 days | 14 days | B. (cooked) | 0 day | 7 days | 14 days |
|---|---|---|---|---|---|---|---|
| (1). 1.70% sorbitol solids [1] | 7 | 8 | 7 | Sorbitol | 8 | 9 | 9 |
| (2). 1.90% corn syrup solids | 6 | 5 | 4 | Corn syrup | 7 | 6 | 6 |
| (3). Control | 6 | 6 | 4 | Control | 7 | 6 | 6 |

[1] Plus 10 p.p.m. dimethylpolysiloxane.

Here again, it can be seen that the color of the frankfurter containing the sorbitol and dimethylpolysiloxane was superior to the control containing no additive and the frankfurters containing corn syrup both with respect to color of the uncooked frankfurter and color of the cooked frankfurter. With respect to the cooked frankfurter, it will be observed that the color actually improved as time passed. This of course, is in direct contradistinction to the color of the control and those frankfurters containing conventionally employed corn syrup. Frankfurters produced as above were held in storage at 40° F., in order to determine their shelf life. The results of such an experiment to determine the shelf life of frankfurters containing the sorbitol additive can be seen by reference to the following table:

| | 7 days | 14 days | 21 days | 28 days |
|---|---|---|---|---|
| (1) Sorbitol, 1.70% | Good | Good | Good | Good. |
| (2) Corn syrup, 1.90% | do | [1] | Very slimy | Very slimy. |
| (3) Control | do | Good | [1] | Slimy. |

[1] Very slightly slimy.

Here again, with respect to the shelf life determination, it can be seen that the frankfurters, including the sorbitol additive are vastly superior to either the controls containing no additive at all or the frankfurters containing conventionally employed corn syrup. In this regard it is noted that the frankfurters containing corn syrup became very slimy after only 14 or 21 days' storage under 40° F. conditions.

Employing the same frankfurters as above, peeling tests were run in order to provide for a comparison of the peeling characteristics of frankfurters containing no additive, those containing corn syrup, and those containing sorbitol in accordance with the present invention.

The following table illustrates the results of such peeling test:

| | Percent skips |
|---|---|
| (1) Sorbitol (1.70%) | 0.5 |
| (2) Corn syrup (1.90%) | 0.8 |
| (3) Control | 1.8 |

The number of skips represented in the above table indicates the number of frankfurters which could not be peeled on the apparatus provided therefor, owing to the poor peeling characteristics of the frankfurter. It can be seen again that the employment of sorbitol in accordance with the present invention, provides for improved peeling characteristics.

EXAMPLE V

A further test was conducted on pork and beef skinless frankfurters in order to compare the color enhancing characteristics of sorbitol in accordance with the present invention, to conventionally employed cane sugar solids. The results of such a test evaluating the color both on the uncooked and cooked frankfurter can be seen in the following table:

| Color A. (uncooked) | 0 day | 7 days | 14 days | B. (cooked) | 0 day | 7 days | 14 days |
|---|---|---|---|---|---|---|---|
| (1). 1.70% sorbitol solids | 9 | 9 | 9 | Sorbitol, 1.70% | 10 | 10 | 10 |
| (2). 2.0% cane sugar solids | 5 | 5 | 4 | Cane sugar, 2.0% | 6 | 5 | 5 |

It can be seen from the results shown in the above table that the difference in the color of the frankfurter in containing sorbitol and cane sugar is rather drastic. Thus, on a scale of 0–10, the uncooked frankfurters containing sorbitol rated 9 both immediately and fourteen days later, while those subjected to cooking rated 10, both immediately thereafter and again fourteen days after the cooking. This can be compared to ratings of 5 and 4 associated with similar frankfurters containing cane sugar. This, therefore, indicates the unexpected ability of sorbitol to act in a manner to enhance the color of frankfurters.

A similar shelf life test, as conducted in Example IV was made by again holding the frankfurter samples at 40° F. The results of such test can be seen from the following table:

| | 10 days | 20 days |
|---|---|---|
| (1) Sorbitol, 1.70% | Good | Good. |
| (2) Cane sugar, 2.0% | Slightly slimy | Slimy. |

Here again, it can be seen by reference to the above table, that the use of sorbitol provides for enhanced shelf life when compared, for example, to similar frankfurters containing cane sugar.

The above tests, as well as the previous test conducted to determine the color improving characteristics, shelf life improving characteristics and peeling characteristics of frankfurters including sorbitol or sorbitol and dimethylpolysiloxane were run on batch sizes of 300 lbs. The values reported in the above noted tables, therefore, constitute average values obtained through observations under the conditions specified.

It can clearly be seen from the above that the use of sorbitol provides for enhanced coloration, improved peeling characteristics, and an increased shelf life. These properties associated with the inclusion of sorbitol in a minor amount in a frankfurter, are completely unexpected from the known properties of such a material.

We claim:

1. In a method of preparing a frankfurter including forming an emulsion consisting essentially of meat and optional fillers, stuffing such emulsion into a casing, and thereafter smoking the meat, the improvement which comprises providing increased shelf life and improved color for said frankfurter by incorporating in said emulsion from about 0.5% to about 5.0% sorbitol based on the weight of the emulsion, whereby said sorbitol acts as a peeling aid in removing the casing from the smoked frankfurter product.

2. The method of claim 1 wherein the sorbitol is added as an aqeuous solution.

3. In a method of preparing a frankfurter including forming an emulsion consisting essentially of meat and optional fillers, stuffing such emulsion into casings, and thereafter smoking the meat, the improvement which comprises providing increased shelf life and improved color for said frankfurter by incorporating in said emulsion from about 0.5% to about 5.0% sorbitol based on the weight of the emulsion, and from about 0.01 to about 0.05% by weight of dimethylpolysiloxane based on the weight of said sorbitol.

4. The method of claim 3 wherein the sorbitol and dimethylpolysiloxane are added as an aqueous solution or emulsion.

5. A composition adapted to be added to a frankfurter to improve color, shelf life and peeling characteristics consisting essentially of an aqueous solution or emulsion of about 20% to about 90% by weight of sorbitol and from about 0.01 to about 0.05% by weight of dimethyl polysiloxane based on the weight of the sorbitol.

6. A composition adapted to be added to a frankurter to improve color, shelf life and peeling characteristics consisting of sorbitol and from about 0.01 to about 0.05% by weight of dimethylpolysiloxane based on the weight of the sorbital.

References Cited

UNITED STATES PATENTS

| 2,685,518 | 8/1954 | Prohaska | 99—109 |
| 2,946,692 | 7/1960 | Kahn et al. | 99—107UX |
| 3,068,104 | 12/1962 | Gretler et al. | 99—109 |
| 3,202,514 | 8/1965 | Burgess et al. | 99—107X |
| 3,307,956 | 3/1967 | Chiu et al. | 99—176 |

HYMAN LORD, Primary Examiner